(12) United States Patent
Uneura et al.

(10) Patent No.: US 9,903,226 B2
(45) Date of Patent: Feb. 27, 2018

(54) TURBOCHARGER

(71) Applicant: IHI Corporation, Koto-ku (JP)

(72) Inventors: Yutaka Uneura, Tokyo (JP); Yuichi Daito, Tokyo (JP); Tomohiro Inoue, Tokyo (JP)

(73) Assignee: IHI Corporation, Koto-ku (JP)

( * ) Notice: Subject to any disclaimer, the term of this patent is extended or adjusted under 35 U.S.C. 154(b) by 876 days.

(21) Appl. No.: 14/164,581

(22) Filed: Jan. 27, 2014

(65) Prior Publication Data

US 2014/0219777 A1    Aug. 7, 2014

(30) Foreign Application Priority Data

Feb. 5, 2013   (JP) .................................. 2013-020600

(51) Int. Cl.
  *F01D 25/18*   (2006.01)
  *F01D 25/12*   (2006.01)
  (Continued)

(52) U.S. Cl.
  CPC .......... *F01D 25/186* (2013.01); *F01D 25/125* (2013.01); *F01D 25/18* (2013.01);
  (Continued)

(58) Field of Classification Search
  CPC ...... F01D 25/186; F01D 25/125; F01D 25/18; F05D 2220/40
  (Continued)

(56) References Cited

U.S. PATENT DOCUMENTS 3,740,170 A * 6/1973 Miller ................... F01D 25/125
                                                184/6.11
4,624,629 A    11/1986 Murayama et al.
(Continued)

FOREIGN PATENT DOCUMENTS

CN       1201105 A     12/1998
CN     101008345 A      8/2007
(Continued)

OTHER PUBLICATIONS

English translation of JP 2009127437 A obtain from Espacenet, https://www.epo.org/index.html , Oct. 25, 2016.*
(Continued)

*Primary Examiner* — Kenneth Bomberg
*Assistant Examiner* — Hoon Choi
(74) *Attorney, Agent, or Firm* — Oblon, McClelland, Maier & Neustadt, L.L.P.

(57) ABSTRACT

A turbocharger includes: a turbocharger main body; a bearing hole formed in the turbocharger main body; a turbine shaft rotatably inserted into the bearing hole and having a turbine wheel provided on one end and a compressor wheel provided on the other end; a turbine-side bearing part and a compressor-side bearing part rotatably supporting the turbine shaft and disposed in the bearing hole on a relatively turbine wheel side and on a relatively compressor wheel side, respectively; a cooling oil passage provided radially outside the bearing hole in the turbocharger main body and configured to cool the turbocharger main body with lubricating oil circulated inside; a first oil duct configured to guide lubricating oil after lubricating the compressor-side bearing part to the cooling oil passage; and a second oil duct configured to guide lubricating oil after lubricating the turbine-side bearing part to the cooling oil passage.

6 Claims, 3 Drawing Sheets

(51) Int. Cl.
*F16C 17/02* (2006.01)
*F16C 17/18* (2006.01)

(52) U.S. Cl.
CPC .......... *F05D 2220/40* (2013.01); *F16C 17/02* (2013.01); *F16C 17/18* (2013.01); *F16C 2360/24* (2013.01)

(58) Field of Classification Search
USPC .................................................. 415/111, 112
See application file for complete search history.

(56) References Cited

U.S. PATENT DOCUMENTS

| | | | | |
|---|---|---|---|---|
| 6,126,414 | A * | 10/2000 | Koike ................... | F01D 25/168 384/105 |
| 7,670,056 | B2 * | 3/2010 | Petitjean ................ | F01D 25/16 384/284 |
| 7,753,591 | B2 * | 7/2010 | Petitjean ................ | F01D 25/16 384/397 |
| 2006/0204154 | A1 | 9/2006 | Ward | |
| 2007/0003175 | A1 | 1/2007 | Petitjean et al. | |
| 2009/0110572 | A1 * | 4/2009 | Meacham ................ | F02C 6/12 417/406 |
| 2012/0263589 | A1 | 10/2012 | Iwata et al. | |

FOREIGN PATENT DOCUMENTS

| | | |
|---|---|---|
| CN | 201581983 U | 9/2010 |
| CN | 202611778 U | 12/2012 |
| CN | 102859122 A | 1/2013 |
| DE | 29 45 272 A1 | 5/1980 |
| GB | 2 039 632 A | 8/1980 |
| GB | 2039632 B * | 4/1983 ............. F01D 25/12 |
| JP | 55-165925 U | 11/1980 |
| JP | 4-287836 A | 10/1992 |
| JP | 5-65829 A | 3/1993 |
| JP | 2009-127437 | 6/2009 |
| JP | 2009127437 A * | 6/2009 |
| JP | 2012-219788 A | 11/2012 |
| WO | WO 2011143079 A2 * | 11/2011 ........... F01D 25/166 |

OTHER PUBLICATIONS

Combined Chinese Office Action and Search Report dated Jul. 21, 2016 in Patent Application No. 201410043268.3 (with English translation of categories of cited documents).

Office Action dated Jul. 9, 2015 in the corresponding Germany Application No. 10 2014 201 547.2 (with English Translation).

Combined Office Action and Search Report dated Nov. 4, 2015 in Chinese Patent Application No. 201410043268.3 (with English language translation and English translation of Categories of Cited Documents).

Combined Office Action and Search Report dated Feb. 3, 2017 in Chinese Patent Application No. 201410043268.3 (with English translation of categories of cited documents).

Japanese Office Action datedSep. 27, 2016 in Patent Application No. 2013-020600 (with unedited computer generated English translation).

Japanese Search Report dated Sep. 28, 2016 in Patent Application No. 2013-020600 (with unedited computer generated English translation).

* cited by examiner

TURBOCHARGER

BACKGROUND OF THE INVENTION

1. Field of the Invention

The present invention relates to a turbocharger in which a lubricating oil is supplied to a bearing hole.

2. Related Art

There has heretofore been known a turbocharger having a turbine shaft rotatably held on a bearing housing, the turbine shaft having a turbine wheel provided on one end and a compressor wheel on the other end. Such a turbocharger is connected to an engine, and exhaust gas emitted from the engine rotates the turbine wheel. Also, the rotated turbine wheel rotates the compressor wheel through the turbine shaft. Thus, the turbocharger compresses the air by the rotation of the compressor wheel, and delivers the compressed air to the engine.

The bearing housing has a bearing hole penetrating in an axial direction of the turbine shaft, and a bearing part is disposed in the bearing hole. A lubricating oil is supplied to the bearing hole from outside the bearing housing. The lubricating oil lubricates the turbine shaft and the bearing part. The lubricating oil lubricates the bearing part and is then discharged to the outside of the bearing hole from both ends of the bearing hole. Japanese Patent Application Laid-Open Publication No. 2009-127437, for example, describes a configuration in which an oil drain passage is provided on a turbine wheel side of a bearing hole and a lubricating oil after lubricating a bearing part is discharged through the oil drain passage. This patent document also describes a configuration in which an oil passage of a cooling oil for cooling (cooling oil passage) is provided in the bearing housing and the cooling oil cools the turbine wheel side of the bearing housing under high temperature.

The cooling oil passage is provided on the turbine wheel side in the bearing housing, and is circularly formed radially outside the oil drain passage of the lubricating oil. A lubricating oil after lubricating a bearing part (radial bearing) on the compressor wheel side and a lubricating oil after lubricating a thrust bearing disposed on the compressor wheel side, for example, are guided to the cooling oil passage.

SUMMARY OF THE INVENTION

If cooling performance becomes insufficient under high temperature or the like, parts such as the bearing and seal ring may have damage such as burn-in and settling, or deterioration of oil remaining in the oil passage may be advanced. Since the temperature becomes high especially on the turbine side of the bearing housing, these phenomena may be prominent in certain operation situations of the engine. Such a phenomenon may cause a vicious circle of deposition of sludge on a wall surface and the like inside the housing, and degradation of the cooling performance. To prevent this, the turbocharger has been required to have much higher cooling performance.

It is an object of the present invention to provide a turbocharger capable of suppressing component degradation and deposition of sludge by improving cooling performance with lubricating oil.

A first aspect of the present invention is a turbocharger including: a turbocharger main body; a bearing hole formed in the turbocharger main body; a turbine shaft rotatably inserted into the bearing hole and having a turbine wheel provided on one end and a compressor wheel provided on the other end; a turbine-side bearing part and a compressor-side bearing part rotatably supporting the turbine shaft and disposed in the bearing hole on a relatively turbine wheel side and a relatively compressor wheel side, respectively; a cooling oil passage provided radially outside the bearing hole in the turbocharger main body and configured to cool the turbocharger main body with lubricating oil circulated inside; a first oil duct configured to guide lubricating oil after lubricating the compressor-side bearing part to the cooling oil passage; and a second oil duct configured to guide lubricating oil after lubricating the turbine-side bearing part to the cooling oil passage.

A second aspect of the present invention is a turbocharger including: a turbocharger main body; a bearing hole formed in the turbocharger main body; a turbine shaft rotatably inserted into the bearing hole and having a turbine wheel provided on one end and a compressor wheel provided on the other end; a turbine-side bearing part rotatably supporting the turbine shaft and disposed in the bearing hole on a relatively turbine wheel side and on a relatively compressor wheel side, respectively; a thrust collar rotated integrally with the turbine shaft; a thrust bearing disposed so as to face the thrust collar in an axial direction of the turbine shaft and configured to receive thrust load on the turbine shaft through the thrust collar; a cooling oil passage provided radially outside the bearing hole in the turbocharger main body and configured to cool the turbocharger main body with lubricating oil circulated inside; a first oil duct configured to guide lubricating oil after lubricating any one of or both of the compressor-side bearing part and the thrust bearing to the cooling oil passage; and a second oil duct configured to guide lubricating oil after lubricating the turbine-side bearing part to the cooling oil passage.

The turbocharger may further include an oil storage part provided on the turbine wheel side of the bearing hole and configured to store lubricating oil after lubricating the turbine-side bearing part, and the second oil duct may communicate with the oil storage part.

The turbocharger may further include a semi-floating metal housed in the bearing hole while being kept from moving in the axial direction and in a rotation direction of the turbine shaft, and having an insertion hole into which the turbine shaft is inserted, and the turbine-side bearing part and the compressor-side bearing part may be formed of a bearing surface that is an inner peripheral surface of the insertion hole in the semi-floating metal.

The present invention can improve cooling performance with lubricating oil and suppress component degradation and deposit of sludge.

DETAILED DESCRIPTION OF THE INVENTION

Figure 1:
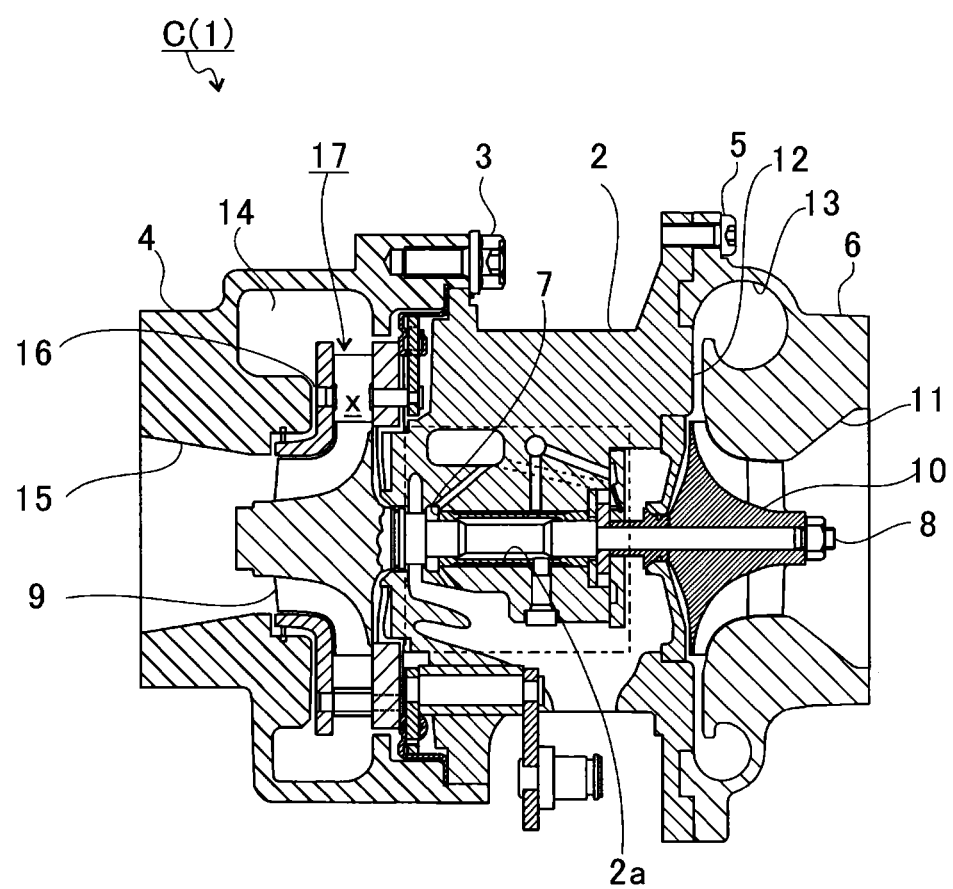
FIG. 1 is a schematic cross-sectional view of a turbocharger according to an embodiment of the present invention.

With reference to the accompanying drawings, embodiments of the present invention will be described in detail below. Dimensions, materials, other specific numerical values, and the like given in the embodiments are for illustrative purposes only, for the sake of easier understanding of the invention, and, unless otherwise noted, are not intended to limit the present invention in any way. Note that, in the present specification and drawings, elements having substantially the same functions and configurations are denoted by the same reference numerals, and repetitive description thereof will be omitted. Elements that are not directly related to the present invention are omitted in the drawings.

FIG. 1 is a schematic cross-sectional view of a turbocharger C. The following description is given assuming that a direction indicated by the arrow L in FIG. 1 is the left side of the turbocharger C and a direction indicated by the arrow R is the right side of the turbocharger C. As shown in FIG. 1, the turbocharger C includes a turbocharger main body 1. The turbocharger main body 1 includes a bearing housing 2, a turbine housing 4 connected to the left side of the bearing housing 2 with a fastening bolt 3, and a compressor housing 6 connected to the right side of the bearing housing 2 with a fastening bolt 5. These housings are integrated.

The bearing housing 2 has a bearing hole 2a formed therein, which penetrates in a horizontal direction of the turbocharger C. A bearing member 7 is provided in the bearing hole 2a. The bearing member 7 rotatably supports a turbine shaft 8 or receives thrust load acting on the turbine shaft 8. The turbine shaft 8 has a turbine wheel 9 integrally fixed to its left end. The turbine wheel 9 is rotatably housed in the turbine housing 4. Also, the turbine shaft 8 has a compressor wheel 10 integrally fixed to its right end. The compressor wheel 10 is rotatably housed in the compressor housing 6.

An inlet 11 is formed in the compressor housing 6. The inlet 11 has its opening on the right side of the turbocharger C, and is connected to an air cleaner (not shown). Also, in a state where the bearing housing 2 and the compressor housing 6 are connected to each other with the fastening bolt 5, facing surfaces of the both housings 2 and 6 form a diffuser passage 12 which increases the air pressure. The diffuser passage 12 is circularly formed from an inner side to an outer side in a radial direction of the turbine shaft 8 (compressor wheel 10). The diffuser passage 12 on the inner side in the radial direction communicates with the inlet 11 through the compressor wheel 10.

Moreover, the compressor housing 6 has a compressor scroll passage 13 provided therein, which is circularly formed and positioned outside the diffuser passage 12 in the radial direction of the turbine shaft 8 (compressor wheel 10). The compressor scroll passage 13 communicates with an inlet of an engine (not shown) and also with the diffuser passage 12. Therefore, when the compressor wheel 10 is rotated, air is taken into the compressor housing 6 from the inlet 11. The air taken has its speed increased mainly by the action of centrifugal force while passing between blades of the compressor wheel 10, has its pressure increased through the diffuser passage 12 and the compressor scroll passage 13, and is then guided to the inlet of the engine.

The turbine housing 4 has a turbine scroll passage 14 provided therein, which is circularly formed and positioned outside the turbine wheel 9 in the radial direction of the turbine shaft 8. The turbine housing 4 also has an outlet 15 formed therein. The outlet 15 communicates with the turbine scroll passage 14 through the turbine wheel 9, and is also connected to an exhaust emission control system (not shown) facing the front of the turbine wheel 9.

In a state where the bearing housing 2 and the turbine housing 4 are connected to each other with the fastening bolt 3, a space 16 is formed between the facing surfaces of the both housings 2 and 4. The space 16 forms a flow passage (variable flow passage) x, through which exhaust gas is circulated, and is circularly formed from the inner side to the outer side in the radial direction of the turbine shaft 8.

The turbine scroll passage 14 communicates with a gas inlet (not shown) into which exhaust gas emitted from the engine (not shown) is guided. The turbine scroll passage 14 also communicates with the space 16 described above. Therefore, the exhaust gas is guided to the turbine scroll passage 14 from the gas inlet, and then to the outlet 15 through the flow passage x and the turbine wheel 9. In this circulation process, the exhaust gas rotates the turbine wheel 9. The torque of the turbine wheel 9 is transmitted to the compressor wheel 10 through the turbine shaft 8 to rotate the compressor wheel 10. As described above, the air has its pressure increased and is guided to the inlet of the engine by the torque of the compressor wheel 10.

When a flow rate of the exhaust gas guided to the turbine housing 4 changes, rotation amounts of the turbine wheel 9 and compressor wheel 10 also change. When the rotation amounts of the both wheels 9 and 10 change, the air having the pressure fully increased cannot sometimes be stably guided to the inlet of the engine. To prevent this, a variable stator vane mechanism 17 is provided in the space 16. The variable stator vane mechanism 17 is fixed to the facing surfaces of the turbine housing 4 and bearing housing 2, and adjusts the opening of the flow passage x (a flow passage area and a gap between nozzles).

The variable stator vane mechanism 17 changes a flow speed of the exhaust gas guided to the turbine wheel 9 according to the flow rate of the exhaust gas. To be more specific, when a rotation speed of the engine is low and the flow rate of the exhaust gas is low, the variable stator vane mechanism 17 increases the flow speed of the exhaust gas guided to the turbine wheel 9 by reducing the opening of the flow passage x. As a result, the turbine wheel 9 can be rotated even with a low flow rate.

Figure 2:
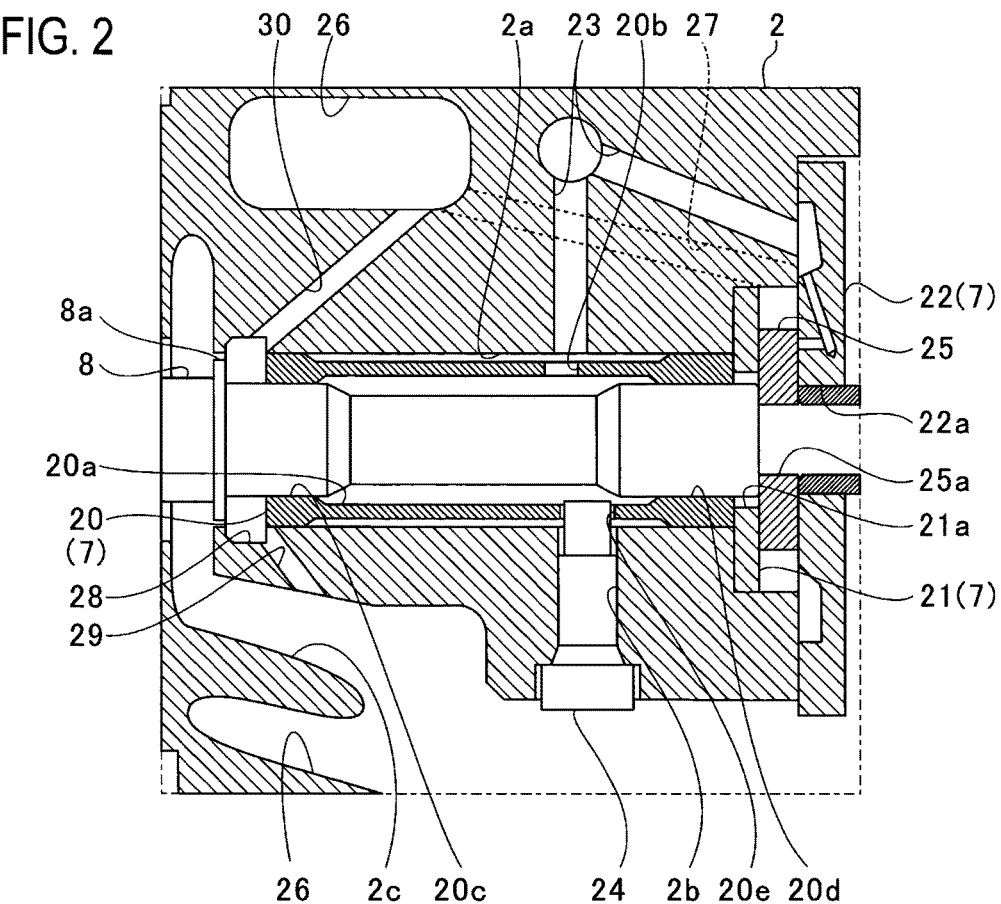
FIG. 2 is a partially enlarged view of an inside of a bearing housing shown in FIG. 1.

FIG. 2 is a partially enlarged view of the inside of the bearing housing 2 shown in FIG. 1. FIG. 2 shows only the portion indicated by the dashed line in FIG. 1. With reference to FIG. 2, the bearing member 7 provided in the bearing hole 2a will be described below.

The bearing member 7 includes a radial bearing 20 rotatably supporting the turbine shaft 8 and thrust bearings 21 and 22 receiving thrust load acting on the turbine shaft 8.

The radial bearing 20 is made of so-called semi-floating metal. The radial bearing 20 has an insertion hole 20a penetrating in the axial direction of the turbine shaft 8. The turbine shaft 8 is inserted into the insertion hole 20a. The radial bearing 20 has a hole 20b formed therein, which penetrates the radial bearing 20 from its inner peripheral surface (the insertion hole 20a) to outer peripheral surface.

A lubricating oil passage 23 is provided in the bearing housing 2. The lubricating oil passage 23 extends from the outside of the bearing housing 2 and communicates with the radial bearing 20 and the thrust bearing 22. The lubricating oil is supplied to the bearing hole 2a from the lubricating oil passage 23. Then, some of the lubricating oil flows into a gap between the outer peripheral surface of the radial bearing 20 and the bearing hole 2a to cool the bearing housing 2 or lubricate the thrust bearing 21. Also, some of the lubricating oil flows into the hole 20b in the radial bearing 20, and is guided to the inner peripheral surface of the radial bearing 20.

A bearing surface is provided on the inner peripheral surface of the radial bearing 20. The bearing surface holds an oil film between the radial bearing and the turbine shaft 8 by the lubricating oil flowing in through the hole 20*b*, and receives load in the radial direction of the turbine shaft 8 by the pressure of the oil film. Hereinafter, a part of the bearing surface on the relatively turbine wheel 9 side (left side in FIG. 2) will be referred to as a turbine-side bearing part 20*c* and a part of the bearing surface on the relatively compressor wheel 10 side (right side in FIG. 2) will be referred to as a compressor-side bearing part 20*d*.

Moreover, a pin hole 20*e* is provided in the radial bearing 20. The pin hole 20*e* penetrates in a direction perpendicular to the axial direction of the turbine shaft 8. A screw hole 2*b* is formed in the bearing housing 2. The screw hole 2*b* penetrates from the outer side to the inner side in the radial direction of the bearing hole 2*a*. Also, the screw hole 2*b* faces the pin hole 20*e* in the radial bearing 20 housed in the bearing hole 2*a*.

A pin 24 has a thread groove in a portion thereof, which screws the pin into the screw hole 2*b*. The tip of the pin 24 is inserted into the pin hole 20*e* in the radial bearing 20. Thus, the radial bearing 20 is kept from moving relative to the bearing hole 2*a* in the axial direction and in a rotation direction of the turbine shaft 8.

A thrust collar 25 has a fixing hole 25*a*, into which the turbine shaft 8 is inserted. The thrust collar 25 is fixed, with the turbine shaft 8 inserted in the fixing hole 25*a*, on a portion of the turbine shaft 8 located closer to the compressor wheel 10 than the radial bearing 20 is, and is rotated integrally with the turbine shaft 8.

The thrust bearings 21 and 22 are disposed on both sides, one on each side, of the thrust collar 25 in the axial direction of the turbine shaft 8, and receive load (thrust load) in the axial direction of the turbine shaft 8. The thrust bearings 21 and 22 have a relationship such that the turbine shaft 8 and the thrust bearings 21 and 22 are rotated relative to each other with the turbine shaft 8 inserted in insertion holes 21*a* and 22*a* penetrating in the axial direction of the turbine shaft 8.

The lubricating oil is supplied to the thrust bearings 21 and 22 and the thrust collar 25 directly from the lubricating oil passage 23. The lubricating oil after lubricating the compressor-side bearing part 20*d* is also supplied to the thrust bearings 21 and 22 and the thrust collar 25.

In this embodiment, a cooling oil passage 26 for cooling the bearing housing 2 is provided.

Figure 3B:
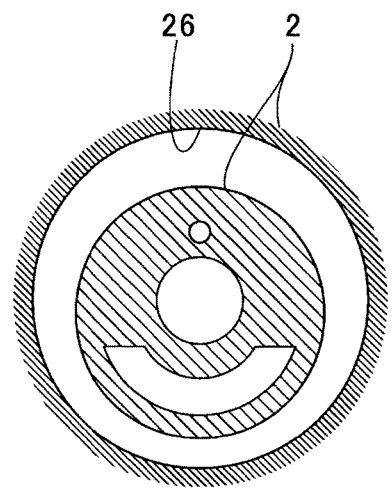
FIGS. 3A and 3B are views for explaining a cooling oil passage, FIG. 3A showing a cross-section of a portion indicated by a dashed line in the bearing housing shown in FIG. 1 and FIG. 3B showing a cross-section taken along the line IIIB-IIIB in FIG. 3A.
Figure 3A:
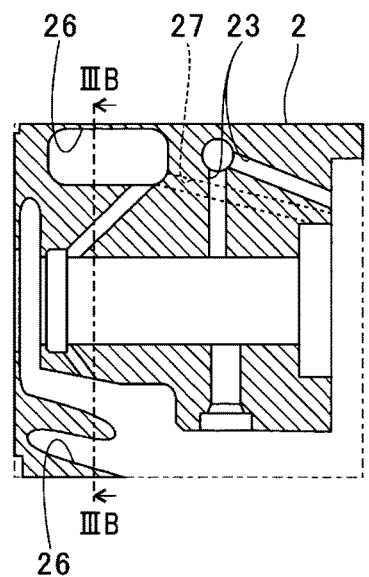

FIGS. 3A and 3B are views for explaining the cooling oil passage 26, FIG. 3A showing a cross-section of a portion indicated by the dashed line in the bearing housing 2 shown in FIG. 1 and FIG. 3B showing a cross-section taken along the line IIIB-IIIB in FIG. 3A.

As shown in FIG. 3A, the cooling oil passage 26 is circularly provided radially outside the turbine shaft 8 (the bearing hole 2*a*) on the turbine side of the bearing housing 2. The cooling oil passage 26 communicates with a portion where the thrust bearing 22 is disposed, through a first oil duct 27 indicated by the broken line in FIG. 3A. The first oil duct 27 is a hole provided in the bearing housing 2. Two first oil ducts 27 are provided at different positions (phases) from the lubricating oil passage 23 in a circumferential direction of the turbine shaft 8.

The first oil duct 27 guides the lubricating oil after lubricating the compressor-side bearing part 20*d* and the thrust bearing 22 to the cooling oil passage 26. The lubricating oil guided from the first oil duct 27 is circulated through the cooling oil passage 26, thereby cooling the bearing housing 2.

As shown in FIG. 2, an oil storage part 28 is provided on the turbine wheel 9 side of the bearing hole 2*a*. The oil storage part 28 is formed to have a diameter larger than that of the portion of the bearing hole 2*a* in which the radial bearing 20 is disposed. The oil storage part 28 temporarily retains the lubricating oil. The lubricating oil to be retained therein is the lubricating oil after lubricating the turbine-side bearing part 20*c* and the lubricating oil discharged to the turbine wheel 9 side while cooling the bearing housing 2 after entering into the gap between the outer periphery of the radial bearing 20 and the bearing hole 2*a*.

An oil drain passage 2*c* is formed in the bearing housing 2. The oil drain passage 2*c* is provided between the oil storage part 28 and the turbine wheel 9. The oil drain passage 2*c* prevents oil leakage to the turbine wheel 9 by guiding the lubricating oil, which is discharged to the turbine wheel 9 side from the oil storage part 28 (the bearing hole 2*a*), to vertically below the turbocharger C. A flange part 8*a* is provided in the turbine shaft 8. The flange part 8*a* disconnects (separates) the oil storage part 28 from the oil drain passage 2*c*. The flange part 8*a* suppresses the discharge of the lubricating oil from the oil storage part 28 to the oil drain passage 2*c*, and generates a certain pressure inside the oil storage part 28.

A second oil duct 30 is a flow passage extending from an upper end of the oil storage part 28 and communicating with a portion of the cooling oil passage 26 vertically above the bearing hole 2*a*. The second oil duct 30 is provided at a position having a different phase from the first oil duct 27 in the circumferential direction of the turbine shaft 8. Some of the lubricating oil accumulated in the oil storage part 28 flows to the cooling oil passage 26 from the second oil duct 30 by the pressure inside the oil storage part 28, which is generated according to the supply pressure.

A discharge passage 29 is a flow passage extending from a lower end of the oil storage part 28 and communicating with the oil drain passage 2*c*. Some of the lubricating oil accumulated in the oil storage part 28 without flowing into the cooling oil passage 26 flows into the oil drain passage 2*c* through the discharge passage 29 by the pressure inside the oil storage part 28, which is generated according to the supply pressure. Note that the discharge passage 29 may be omitted according to the specifications of the engine and the like.

The second oil duct 30 guides, to the cooling oil passage 26, the lubricating oil after lubricating the turbine-side bearing part 20*c* and the lubricating oil discharged to the turbine wheel 9 side while cooling the bearing housing 2 after entering into the gap between the outer periphery of the radial bearing 20 and the bearing hole 2*a*. Meanwhile, the first oil duct 27 also guides the lubricating oil to the cooling oil passage 26. These oil ducts 27 and 30 increase the amount of the lubricating oil circulated through the cooling oil passage 26. As a result, cooling performance by the lubricating oil is improved, and thus component degradation and sludge deposit can be suppressed.

Moreover, since the second oil duct 30 communicates with the oil storage part 28, the lubricating oil guided to the turbine side of the bearing hole 2*a* or the oil storage part 28 is guided to the cooling oil passage 26. Therefore, the lubricating oil to be discharged to the turbine wheel 9 can be reduced, and thus oil leakage to the turbine wheel 9 can be reduced.

Figure 4:
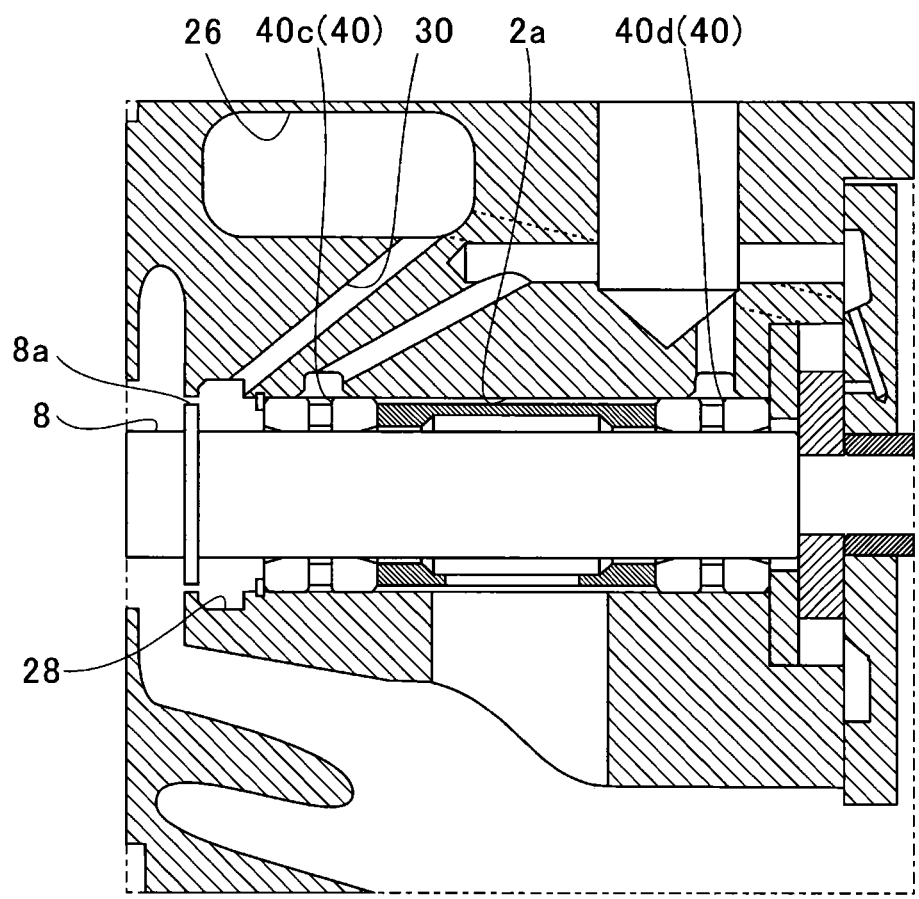
FIG. 4 is a schematic cross-sectional view of a portion corresponding to FIG. 2 in a modified example.

In the above embodiment, the bearing rotatably supporting the turbine shaft 8 is made of semi-floating metal. However, as in a modified example shown in FIG. 4, a bearing (radial bearing 40) rotatably supporting the turbine shaft 8 may be made of so-called full-floating metal. In this case, the radial bearing 40 includes a turbine-side bearing part 40c and a compressor-side bearing part 40d, and receives load in the radial direction of the turbine shaft 8. Note that the turbine-side bearing part 40c is full-floating metal disposed on the relatively turbine wheel 9 side in the bearing hole 2a. Meanwhile, the compressor-side bearing part 40d is full-floating metal disposed on the relatively compressor wheel 10 side.

Also in the modified example, as in the case of the above embodiment, an oil storage part 28 is provided on the turbine wheel 9 side of the bearing hole 2a, and a flange part 8a is provided to disconnect the oil storage part 28 from the oil drain passage 2c. Also, a certain pressure is applied to the lubricating oil stored in the oil storage part 28, and the lubricating oil is guided to the cooling oil passage 26 through the second oil duct 30 by the pressure. Therefore, as in the case of the above embodiment, the amount of the lubricating oil circulated through the cooling oil passage 26 can be secured. However, there is a characteristic that the oil pressure of the lubricating oil inside the bearing hole 2a is maintained to be higher when the semi-floating metal is used than when the full-floating metal is used. For this reason, when the semi-floating metal is used as the bearing which supports the turbine shaft 8, the amount of the lubricating oil to be guided to the cooling oil passage 26 can be further increased.

In the above embodiment, the thrust bearings 21 and 22 are provided. However, the semi-floating metal which forms the radial bearing 20 may receive thrust load without providing the thrust bearings 21 and 22. In this case, the first oil duct 27 guides the lubricating oil after lubricating the compressor-side bearing part 20d to the cooling oil passage 26. More specifically, the first oil duct 27 is configured to guide, to the cooling oil passage 26, the lubricating oil after lubricating any one of or both of the compressor-side bearing part 20d and the thrust bearings 21 and 22.

In the above embodiment and the modified example, one thrust collar 25 is provided and two thrust bearings 21 and 22 are provided on both sides of the thrust collar 25 in the axial direction of the turbine shaft 8. Meanwhile, one thrust bearing may be provided and two thrust collars may be provided on both sides of the one thrust bearing in the axial direction of the turbine shaft 8.

In the above embodiment and the modified example, one second oil duct 30 is provided. However, multiple second oil ducts 30 may be provided while shifting phases (positions) in the circumferential direction of the turbine shaft 8.

As long as the end portion (opening portion) of the second oil duct 30 on the bearing hole 2a side is positioned closer to the turbine wheel 9 than the end portion, of the first oil duct 27, on the bearing hole 2a side so that the lubricating oil after lubricating the turbine-side bearing parts 20c and 40c is circulated through the second oil duct 30, the position of the end portion is not limited. However, when the radial bearing 20 made of semi-floating metal is provided, the lubricating oil guided to the gap between the outer peripheral surface of the radial bearing 20 and the bearing hole 2a has a temperature lower than that of the lubricating oil after lubricating the turbine-side bearing part 20c. Therefore, as shown in FIG. 2, lower-temperature lubricating oil can be guided to the cooling oil passage 26 in such a way that the second oil duct 30 is provided to communicate with the upper end of the oil storage part 28 and the lubricating oil guided to the gap between the outer peripheral surface of the radial bearing 20 and the bearing hole 2a is actively sent to the second oil duct 30.

Note that, in the above embodiment and the modified example, vertically downward means a direction in which the gravity acts on the turbocharger C in a posture when the turbocharger C is mounted on a vehicle or the like placed on a horizontal surface, for example. In FIGS. 1 to 4, the vertically downward direction is the lower side.

While the preferred embodiments of the present invention have been described above with reference to the accompanying drawings, it is needless to say that the present invention is not limited to the above embodiments. It will be apparent to those skilled in the art that various modifications and changes can be supposed to be made to the invention within the scope described in the following claims. It should be understood that those modifications and changes fall within the technical scope of the present invention.

What is claimed is:

1. A turbocharger comprising:
a turbocharger main body;
a bearing hole formed in the turbocharger main body;
a turbine shaft rotatably inserted into the bearing hole, the turbine shaft having a turbine wheel provided on a first end of the turbine shaft, a compressor wheel provided on a second end of the turbine shaft, and a flange projecting radially outward, the flange including a radial outer surface;
a turbine-side bearing part and a compressor-side bearing part rotatably supporting the turbine shaft and disposed in the bearing hole on a turbine wheel side of the bearing hole and on a compressor wheel side of the bearing hole, respectively;
a cooling oil passage provided radially outside the bearing hole in the turbocharger main body and configured to cool the turbocharger main body with lubricating oil circulated inside;
an oil storage part formed on the turbine wheel side of the bearing hole as one part of the bearing hole with a diameter larger than that of an other part of the bearing hole, the oil storage part including a radially inward facing edge located on a turbine wheel side of the oil storage part, the radially inward facing edge facing to the radial outer surface of the flange of the turbine shaft;
an oil drain passage provided in the turbocharger main body between the turbine wheel and the oil storage part, the oil drain passage being configured to flow a discharged lubricating oil from the turbine wheel side of the bearing hole;
a first oil duct configured to guide the lubricating oil after lubricating the compressor-side bearing part to the cooling oil passage; and
a second oil duct communicated from the oil storage part to the cooling oil passage.

2. The turbocharger according to claim 1, further comprising:
a semi-floating metal bearing housed in the bearing hole while being kept from moving in an axial direction and in a rotation direction of the turbine shaft, and having an insertion hole into which the turbine shaft is inserted,
wherein the turbine-side bearing part and the compressor-side bearing part are formed of a bearing surface that is an inner peripheral surface of the insertion hole in the semi-floating metal bearing.

3. The turbocharger according to claim 1, wherein the turbocharger main body includes a discharge passage extending from the oil storage part to the oil drain passage.

4. A turbocharger comprising:

a turbocharger main body;

a bearing hole formed in the turbocharger main body;

a turbine shaft rotatably inserted into the bearing hole, the turbine shaft having a turbine wheel provided on a first end of the turbine shaft, a compressor wheel provided on a second end of the turbine shaft, and a flange projecting radially outward, the flange including a radial outer surface;

a turbine-side bearing part and a compressor-side bearing part rotatably supporting the turbine shaft and disposed in the bearing hole on a turbine wheel side of the bearing hole and on a compressor wheel side of the bearing hole, respectively;

a thrust collar rotated integrally with the turbine shaft;

a thrust bearing disposed so as to face the thrust collar in an axial direction of the turbine shaft and configured to receive thrust load on the turbine shaft through the thrust collar;

a cooling oil passage provided radially outside the bearing hole in the turbocharger main body and configured to cool the turbocharger main body with lubricating oil circulated inside;

an oil storage part formed on the turbine wheel side of the bearing hole as one part of the bearing hole with a diameter larger than that of an other part of the bearing hole, the oil storage part including a radially inward facing edge located on a turbine wheel side of the oil storage part, the radially inward facing edge facing to the radial outer surface of the flange of the turbine shaft;

an oil drain passage provided in the turbocharger main body between the turbine wheel and the oil storage part, the oil drain passage being configured to flow a discharged lubricating oil from the turbine wheel side of the bearing hole;

a first oil duct configured to guide the lubricating oil after lubricating any one of or both of the compressor-side bearing part and the thrust bearing to the cooling oil passage; and a second oil duct communicated from the oil storage part to the cooling oil passage.

5. The turbocharger according to claim 4, further comprising:

a semi-floating metal bearing housed in the bearing hole while being kept from moving in the axial direction and in a rotation direction of the turbine shaft, and having an insertion hole into which the turbine shaft is inserted, wherein the turbine-side bearing part and the compressor-side bearing part are formed of a bearing surface that is an inner peripheral surface of the insertion hole in the semi-floating metal bearing.

6. The turbocharger according to claim 4, wherein the turbocharger main body includes a discharge passage extending from the oil storage part to the oil drain passage.

* * * * *